United States Patent Office 3,503,875
Patented Mar. 31, 1970

3,503,875
SOLVENT EXTRACTION OF AROMATIC HYDRO-
CARBONS WITH ε-CAPROLACTAM
Doru Grigoriu, Str. Nordului, bloc 14; Stefan Despa, Str.
Eminescu 22; Rodica Ilie, Str. Gloriei 3; Ion Farcas,
Str. Republicii 130; and Ion Zirna and Dumitru Iorga,
both of Str. Eminescu 22, all of Ploesti, Rumania
No Drawing. Filed Dec. 5, 1967, Ser. No. 687,991
Claims priority, application Rumania, Dec. 6, 1966,
52,677/66
Int. Cl. C10g 21/20
U.S. Cl. 208—326                                    12 Claims

ABSTRACT OF THE DISCLOSURE

Process for the solvent extraction of liquid petroleum fractions distilling at temperatures between 10° C. and 600° C. to recover aromatics therefrom wherein the extraction is carried out in a multi-stage extractor, e.g., rotary-disk contactor, at temperatures between 0° C. and 200° C. (preferably 10° C. to 100° C.) with a solvent consisting at least 50% by weight of ε-caprolactam, the balance being water (e.g. 15 to 35% by weight) and/or polar organic solvents, such as glycols, pyrrolidones, nitriles or sulfolane, the solvent ratio being 0.25:1 to 20:1 (preferably 1:1 to 15:1).

Our present invention relates to a process for the liquid-liquid extraction of liquid organic mixtures containing aromatic hydhocarbons and, more particularly, to a process for the extraction of petroleum fractions to recover aromatic hydrocarbons therefrom.

The use of liquid-liquid extraction techniques for recovering selectively one or more components from a liquid organic mixture has found special application with petroleum fractions obtained from conventional fractionating stills or from various treatments designed to improve the yield of such stills. For example, extraction techniques have been proposed for organic mixtures derived from the refining of crude oil, the recovery of oil from shale and the distillation of coal. When reference is made hereinafter to liquid organic mixtures containing aromatic hydrocarbons, it is thus intended to include all such mixtures no matter where originating. Thus aromatic hydrocarbons are found in petroleum fractions obtained by atmospheric-pressure or subatmospheric-pressure (vacuum) distillation, catalytic cracking, thermal and catalytic reforming, delayed coking, thermal cracking, pyrolysis, visbreaking and hydrogenation of petroleum mixtures and mixtures provided for organic synthesis. In addition, the distillation of coal produces liquid mixtures of a similar nature.

The aromatic hydrocarbons contained in these mixtures, which generally have a boiling-point range or distillation range of 10° C. to 600° C., have molecular weights ranging between 78 (benzene) to 300 or more in the case of aromatic extracts from mineral oils. As indicated above, it has long been recognized that selective extraction of components of these mixtures may provide a uniform technique for recovering them on an industrial scale. Thus, a variety of selective solvents have been proposed for extraction of aromatic hydrocarbons from liquid mixtures of the type described. These systems include the use of sulfur dioxide in the Edeleanu process and its variants, the use of furfural and phenols in a refining process for mineral oils, diethylene glycol and other glycols in the UDEX extraction process and its variants, N-methylpyrrolidone in the process identified by the name of this solvent, Sulfonal (sulfolane) in the Shell process, and dimethyl sulfoxide in the process developed by the Petroleum Institute of France. Other polar solvents which have been proposed are morpholine and a class of nitriles. These polar solvents, when used alone or in mutual admixture, are associated with various problems including high cost, low availability, instability with respect to oxidation, corrosive tendencies and toxicity. Physical characteristics also are generally disadvantageous, especially with respect to vapor pressure, specific heat, latent heat and polar character. Of even greater significance is the lack of selectivity and dissolving capacity. The selectivity of the solvent, which can be expressed as the distribution ratio of aromatic components to nonaromatics picked up by the solvent, is generally poor for the aforementioned polar organic substances whenever they have high dissolving capacities (i.e. expressed as the distribution ratio of aromatics in the raffinate to aromatics in the extract) and vice versa.

It is, therefore, the principal object of the present invention to provide an improved process for the recovery of aromatic components from petroleum fractions and other liquid organic mixtures containing aromatic hydrocarbons.

We have, surprisingly, found that liquid-liquid extraction of petroleum fractions and other liquid organic mixtures containing aromatic hydrocarbons, having a distillation range between 10° C. and 600° C., can be carried out without the aforementioned disadvantages by using as a solvent for the liquid extraction at least 50% by weight ε-caprolactam, i.e. the amide of ε-amino caproric acid; the latter may be used alone or in admixture with 0 to 50% by weight of water alone or in combintion with another polar system, preferably one of the glycols, pyrrolidones or nitriles described above or sulfolane. Most advantageously, the distillation range of the petroleum fraction lies within 60° C. to 200° C.

According to a more specific feature of this invention, the extraction is carried out in an apparatus adapted to provide one or more liquid-liquid theoretical-equilibrium stages, for example a rotary-disk contactor, an Oldshue-Rushton column or a Scheibel column, at temperatures between 0° C. and 200° C. (preferably 10° C. to 100° C.), at solvent ratios (weight ratio of solvent to the petroleum fraction or liquid mixture) of 0.25:1 to 20:1. While the latter solvent ratios have been found to be effective, it is preferred to work with ratios in the range of 1:1 to 15:1. The present process also provides for the treatment of the raffinate and extract solutions to recover the solvent contained therein and for establishing the desired concentrations of aromatics in the extract. More specifically, the treatment of the extract and the raffinate can involve a washing of the solutions individually with water to recover the solvent therefrom. Alternatively, the solvent may be recovered from the raffinate and/or the extract by re-extracting them individually with a paraffinic petroleum fraction having a boiling point different from that of the raffinate, the extract and the solvent (i.e. ε-caprolactam). Still another treatment involves the subjection of the raffinate and extract individually to heating and steam. Still another feature of this invention resides in the refluxing, in the extractor, of the extraction phase, with a light petroleum fraction recovered by fractionation either of the raffinate or the extract, with a ratio of the light petroleum fraction to the crude liquid petroleum mixture between 0:1 and 4:1. Preferably, this ratio has a lower value of 0.25:1 and a desirable upper limit of 1.5:1.

Among the advantages of the present system is that it permits extraction to be carried out with relatively low solvent ratios and an extraction apparatus of moderate rather than unusually high efficiency without loss of economy by comparison with earlier systems. Moreover, the recovery of aromatics is high and it has been found possible to obtain extracts which, upon removal of solvent, have almost 100% aromatic composition. Furthermore, a wide range of solvent compositions can be provided within the purview of this invention and it is even possible to make use of apparatus composed of ordinary steel rather than the expensive corrosion-resistant metals hitherto required.

The following examples are provided to illustrate the best mode known to us for carrying out the invention in practice.

EXAMPLE I

A petroleum fraction with a boiling-point range of 60° to 160° C. having a density at 20° C. of 0.7565 and containing 10% by weight aromatic hydrocarbons, is subjected to liquid-liquid extraction in an apparatus which provides at least one theoretical equilibrium, using a solvent consisting of $\epsilon$-caprolactam with 15% by weight water, at a temperature of 20° C., the solvent weight ratio being 3:1. From the operation, a raffinate solution is obtained which contains 1.1% by weight solvent and an extract solution containing 97.5% by weight solvent. The apparatus may be a rotary-disk contactor, see Perry's Chemical Engineers Handbook, McGraw-Hill Publishing Co., Section 21, (1963), and Reman et al., U.S. Patent 2,601,674, 1952; Proc. 3d World Petrol. Congr., Hague, Sec. III, p. 121, 1951; Petrol. Refiner, 34, (9), 129 (1955); Génie chim., 74, 106 (1955); Chem. Eng. Progress, 51, 141 (1955); "Joint Symposium, Scaling-up Chemical Plant and Processes," London, 1957, p. 26. Vermijs and Kramer, Chem. Eng. Sci., 3, 55 (1954). Kalat. Vnukova, and Rapis, Chem. listy, 51, 1249 (1957). Logsdail, Thornton, and Pratt, Trans. Inst. Chem. Engrs., 35, 301 (1957). Takahashi, Suzuki and Yasunaga, Nenryô Kyôkaishi, 37, 547 (1958).

After recovering the solvent from the raffinate solution, by washing with reduced quantities of water, a raffinate is obtained amounting to 91% by weight of the raw product submitted to the extraction, containing 6.9% by weight aromatics, and after recovering the solvent from the extract solution, by heating to 170° C. and steaming, we obtain an extract representing 9% by weight of the raw product, this extract containing 42% by weight aromatics, the selectivity of the operation being 9.66, the ratio of the aromatic distribution having a value of 0.17, and the aromatics recovered in the extract being 36.1%, as referred to the raw product.

EXAMPLE II

A petroleum fraction having a distillation range of 60° to 160° C., density at 20° C. of 0.8193, and containing 80% by weight aromatics, was subjected to extraction in apparatus, e.g. a rotary-disk contactor as in Example I or an Oldshue-Rushton extractor, see Oldshue and Rushton, Chem. Eng. Progress, 48, 297 (1952), Dykstra, Thompson, and Clouse, Ind. Eng. Chem., 50, 161 (1958), which realize a theoretical equilibrium, using $\epsilon$-caprolactam containing 20% by weight water as solvent, at a temperature of 30° C., with a solvent ratio of 3:1 by weight. From the operation we obtained a solution of raffinate containing 14.5% by weight solvent and an extract solution containing 86% by weight solvent. After recovering the solvent from the raffinate solution, by washing with reduced quantities of water, one obtains a raffinate representing 53.3% by weight, referred to the raw product, which contains 71.4% by weight aromatics; after recovering the solvent of the extract, by re-extraction with a paraffinic fraction boiling within 210–300° C., we obtain an extract representing 46.7% by weight of the recovered product containing 91.5% by weight aromatics. The selectivity of the operation is 4.8, the distribution ratio of the aromatics being 0.255, and the recovery of the aromatic from the extract being 59.9%.

EXAMPLE III

A petroleum fraction with a distillation range of 60 to 160° C., containing 45% by weight aromatics, is subjected to extraction in countercurrent with a solvent ratio of 6:1 by weight and a reflux ratio of 0.5:1 by weight, the reflux being obtained by extractive distillation of the extract solution. The extract, upon recovery of solvent therefrom, had a concentration of 99.6% by weight aromatics.

In other tests following generally the above examples, the solvent recovery from the raffinate solution was also carried out by re-extraction with a petroleum fraction having other distillation limits than the raw product, this operation being followed by fractional distillation, and the solvent recovery from the extract solution was also carried out by re-extraction with water or with a petroleum fraction with distillation limits other than that of the extract and of the boiling temperature of the solvent, followed by fractional distillation. In case it is desired to adjust the aromatic concentration of the end extract, it was found to be possible also to use a liquid reflux introduced into the extractor, this reflux being constituted of a paraffinic light fraction produced by fractionating the raffinate or of a light fraction obtained by fractionating the extract in the presence of the solvent (extractive fractionation) or without the latter, or of the mixture of these fractions, the weight ratio of the extractor liquid reflux and the raw product subject to the separation being comprised between 0:1 and 4:1.

At the separation of the aromatic hydrocarbons from the fractions specified in the first two examples, by extraction with diethyleneglycol containing 10% water (without $\epsilon$-caprolactam), at a temperature of 150° C. (the remaining conditions being constant), we obtained a selectivity of 7.64 respectively 4.6, aromatic distribution ratios of 0.107 respectively 4.6, aromatic distribution ratios of 0.107 respectively 0.125, and aromatic recovery of 21.5% and respectively 34.7%, these results being lower as reported to that of the process according to the invention. In addition, $\epsilon$-caprolactam is less corrosive than diethyleneglycol (corrosion rates 0.007–0.01 mm./year and respectively 0.02–0.03 mm./year for carbon steel of usual quality, in similar conditions).

We claim:

1. A process for the liquid-liquid extraction of aromatic hydrocarbon-containing liquid organic mixtures of compounds distilling at temperatures between 10° C. and 600° C., comprising the steps of intimately contacting said mixture at a temperature between 0° C. and 200° C. in at least one liquid-liquid equilibrium stage with a solvent containing at least 50% by weight $\epsilon$-caprolactam and a solvent/liquid mixture ratio between substantially 0.25:1 and 20:1; recovering an extract and a raffinate from said stage; and treating said extract and said raffinate to strip said solvent therefrom.

2. The process defined in claim 1 wherein said solvent consists of said $\epsilon$-caprolactam and at least one polar substance selected from the group which consists of water and polar organic compounds.

3. The process defined in claim 2 wherein said solvent contains 15 to 35% by weight water, the balance being constituted by at least one of said polar organic compounds.

4. The process defined in claim 3 wherein the polar organic compound in said solvent in a glycol, a pyrrolidone, a nitrile or sulfolane.

5. The process defined in claim 2 wherein the solvent/liquid mixture weight ratio is between 1:1 and 15:1.

6. The process defined in claim 5 wherein the temperature at said stage is 10° C. to 100° C.

7. The process defined in claim 1 wherein said extract and said raffinate are washed with water to recover said solvent therefrom.

8. The process defined in claim 1 wherein said solvent is recovered from said raffinate and said extract by re-extracting them with a paraffinic petroleum fraction with a boiling point different from that of the raffinate, the extract and the solvent.

9. The process defined in claim 1 wherein the solvent is recovered from said raffinate and said extract by subjecting them to heat in the presence of steam.

10. The process defined in claim 1, further comprising the step of refluxing the solvent/liquid mixture system with a light petroleum fraction at a weight ratio of the light petroleum fraction to the liquid mixture between 0.25:1 and 4:1.

11. The process defined in claim 10 wherein the weight ratio of the light petroleum fraction to the liquid mixture is between 0.25:1 and 1.5:1.

12. The process defined in claim 10 wherein said light petroleum fraction at least partly consists of a paraffinic fraction obtained by fractionating said raffinate or said extract.

References Cited

UNITED STATES PATENTS

| | | | |
|---|---|---|---|
| 2,933,448 | 4/1960 | Morin et al. | 208—326 |
| 2,943,122 | 6/1960 | Templeman et al. | 208—326 |
| 3,280,024 | 10/1966 | Arich et al. | 208—326 |
| 3,299,158 | 1/1967 | Wirth et al. | 208—326 |

HERBERT LEVINE, Primary Examiner

U.S. Cl. X.R.

208—323; 260—674